Sept. 22, 1942.  E. F. MARTINET  2,296,359
SUCTION CLEANER MOTOR MOUNTING AND FILTER CONSTRUCTION
Filed May 15, 1939   3 Sheets-Sheet 1

Inventor
Eugene F. Martinet
By Frease and Bishop
Attorneys

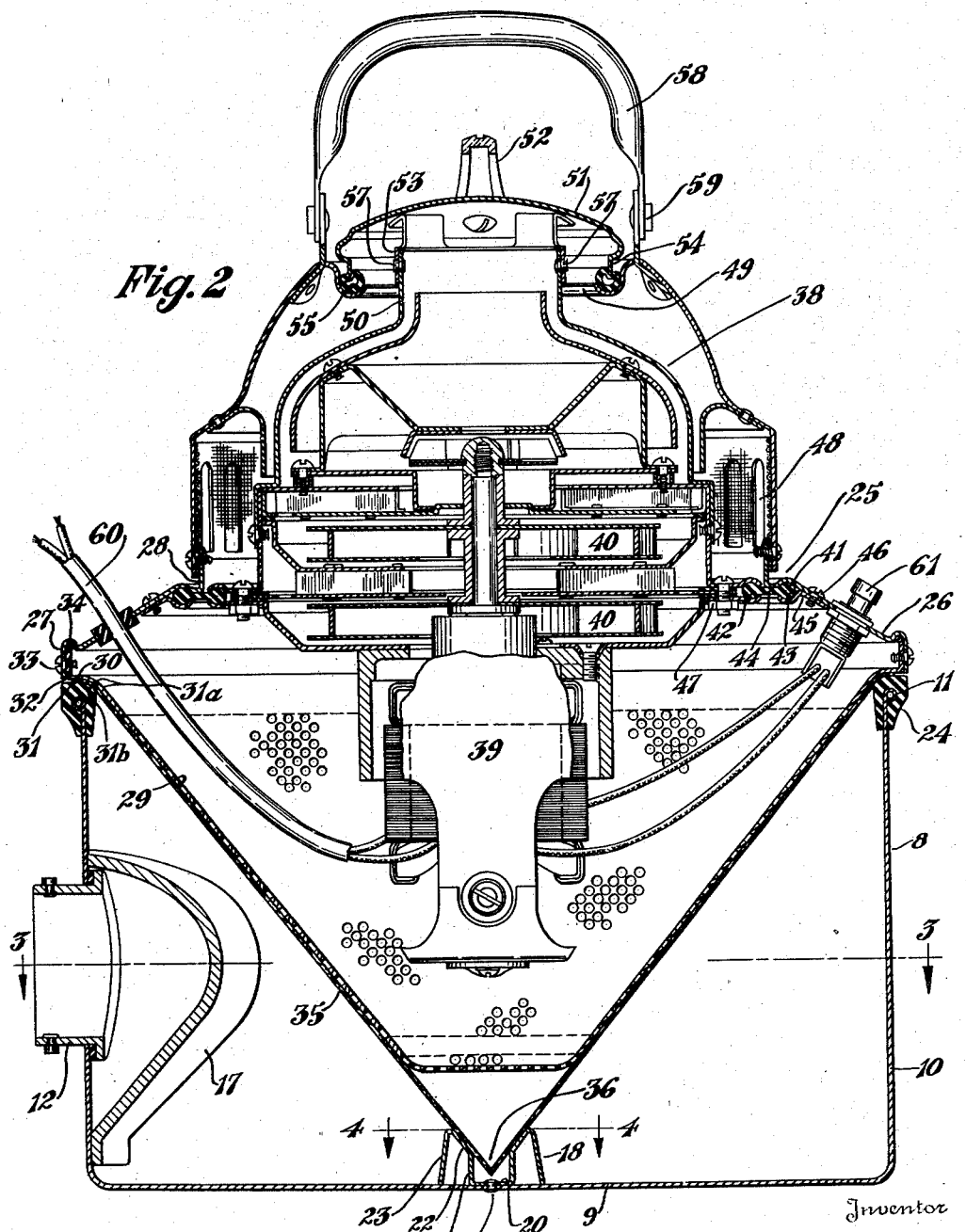

UNITED STATES PATENT OFFICE 2,296,359

SUCTION CLEANER MOTOR MOUNTING AND FILTER CONSTRUCTION

Eugene F. Martinet, Cleveland, Ohio, assignor to The P. A. Geier Company, Cleveland, Ohio, a corporation of Ohio Application May 15, 1939, Serial No. 273,637

5 Claims. (Cl. 183—37)

The invention relates to suction cleaners, and more particularly to a motor mounting and filter construction for a suction cleaner of a vertical type having a pan-like dust collector provided with a filter, and a motor, fan and outlet passage construction mounted on the collector cover for enclosing the dust collector and positioning the filter.

Numerous constructions of suction cleaners of a vertical type have been proposed, but none of such prior constructions have provided a ready, convenient and easy means of locating, supporting and clamping a disposable filter in a pan-like dust receptacle or base.

A vertical type suction cleaner which utilizes a pan-like dust receptacle as a cleaner inlet for the dust laden air, is peculiarly adapted for the use of a disposable filter, such as a paper filter. It is, however, desirable in such construction to eliminate the necessity of touching or handling the filter upon removing the filter from the cleaner; and to provide for the removal of the motor supporting the lid without touching or moving the filter and contents of the dust receptacle, so that the filter and contents of the dust receptacle may be bodily dumped into an incinerator, ash can, furnace, fireplace or the like without touching the filter or the contents of the dust collector.

It is therefore an object of the present invention to provide an improved suction cleaner of the vertical type with a disposable, preferably paper filter construction, which does not require the attachment or detachment of any parts directly to or from the filter in installing or disposing of the filter and collected dirt, and which does not require the filter to be touched by the operator for disposing of the filter and collected dirt.

Moreover, in prior constructions, numerous proposals have been made for the mounting of the motor, fan housing and related parts of the cleaner on a lid member or its equivalent, so as to avoid any noise, due to vibration or centrifugal unbalance emanating from the motor and fan, from being transmitted to any of the metal parts of the lid or pan-like dust receptacle on which the lid member is mounted. However, prior constructions have not satisfied the need, because the constructions proposed have only partially silenced or deadened such noises or the transmission of vibration and the like, and have not entirely eliminated the same.

It is therefore a further object of the present invention to provide an improved vertical type suction cleaner construction in which all moving or rotating parts are mounted in such a way as to eliminate any noise due to vibration or centrifugal unbalance from being transmitted to other parts of the cleaner, which might amplify or act as a sounding board for such noises or sounds.

And finally, it is an object of the present invention to incorporate the aforesaid desiderata in suction cleaner construction in a simple, inexpensive, convenient and readily operated manner, and to reduce the cost and simplify in general the construction of a vertical type suction cleaner.

These and other objects may be attained by the improvements, elements, combinations, attachments, arrangements and constructions comprising the present invention, preferred embodiments of which are illustrated in the accompanying drawings, and are hereinafter described and claimed.

The invention may be stated in general terms as preferably including in suction cleaner construction walls forming an upwardly opening pan-like dust collector, receptacle or base, said walls terminating in an upper annular edge, means forming an inlet opening connection through one of said walls, preferably a shield in said receptacle adjacent said opening for directing an air blast passing through said opening circumferentially around said receptacle, preferably central locating support means at the bottom of said receptacle, an annular preferably soft rubber ring generally U-shaped in cross section engaged over and around said receptacle edge; cover means for said receptacle including walls forming an annular shoulder for abutment against said rubber ring covered receptacle edge, and a foraminous conical filter support extending downward from said shoulder into said receptacle when the cover means is in position closing the upwardly opening dust receptacle; a generally conically shaped, preferably paper filter member having a conical portion adjacent its upper edge interposed between said cover shoulder and rubber ring covered receptacle edge, said central locating support means and said foraminous conical member cooperating to locate said conical filter member in proper dust filtering position when placing the cover means on the receptacle and to prevent collapse of the paper filter member when the cleaner is operating; detachable clamp means for connecting the cover means to the receptacle to clamp said conical portion of the conical filter member by a portion of the conical filter support subjacent the cover shoulder downwardly outwardly against the rubber ring covered receptacle edge in air-tight relation; a motor, fan and outlet passage-forming unit, means mounting said unit on said cover means including an annular preferably rubber mounting and supporting ring having an inner annular bead edge and an outer annular bead edge with an annular web extending between said bead edges, means on said cover means engaging and clamping said outer bead edge, means on said unit engaging and clamping said inner bead edge whereby said rubber rings supports said unit in shear, said cover means also being preferably provided with an opening for permitting a blower attachment to be detachably connected with an exhaust passage of said unit; and a lid for said cover opening preferably detachably engaged with said unit and seated against a rubber gasket carried by said cover means so as to aid in supporting said unit reactively against said rubber supporting ring.

In the drawings:

Fig. 2 is an enlarged vertical section through the vertical type suction cleaner of Fig. 1 showing the improved motor mounting and filter construction;

Similar numerals refer to similar parts throughout the various figures of the drawings.

Figures 3, 4:
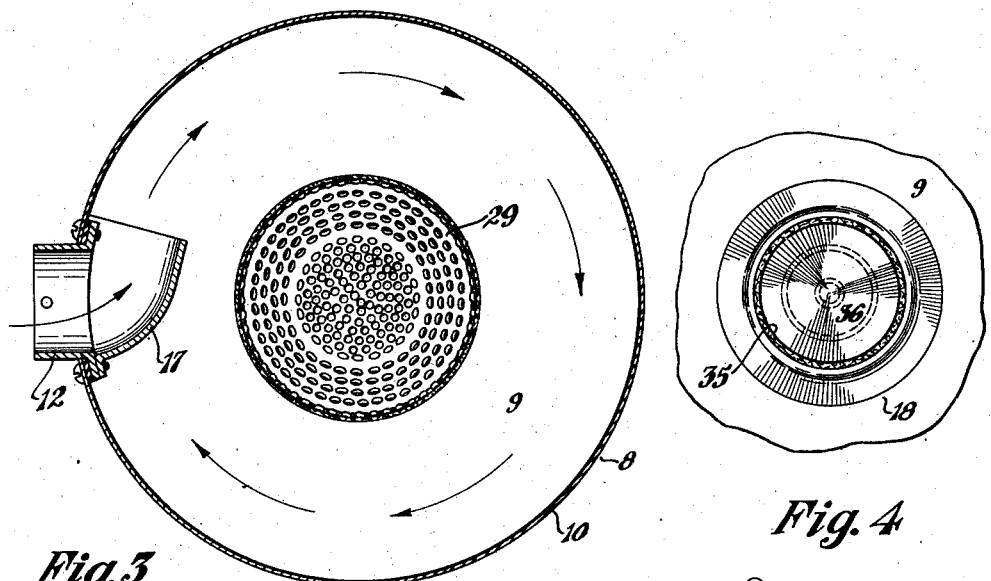
Fig. 3 is a plan sectional view on a smaller scale, taken on the line 3—3, Fig. 2.
Fig. 4 is a view on an enlarged scale, looking in the direction of the arrows 4—4, Fig. 2.

The suction cleaning apparatus shown in the drawings is a "vertical" type suction cleaner and as illustrated in Figs. 1, 2, 3 and 4, includes a panlike dust collector, receptacle or base generally indicated at 8 formed by a bottom wall 9 and an annular side wall 10 which terminates in an upper preferably beaded edge 11 so that the dust receptacle 8 is upwardly open. The receptacle 8 is preferably provided with an inlet opening connector 12 with which a flexible hose 13 may be detachably connected by a hose connector 14; and the hose 13 may be provided at its other end with a tube 15 to which is connected a suitable nozzle 16 or other tool for cleaning any desired surface or article in the usual manner.

The connector 12, as stated, forms an inlet opening through the receptacle side wall 10, and a shield member 17 is preferably mounted within the receptacle 8 adjacent to the connector opening for directing the air blast passing through said opening into the receptacle circumferentially therearound, as shown by the arrows in Fig. 3.

A filter locating support member generally indicated at 18 is centrally located within the receptacle at the bottom thereof by riveting, as shown at 19, or by otherwise connecting the same to the receptacle bottom wall 9 for a purpose to be later described. The member 18 preferably includes a securing portion 20, and an upwardly extending portion 21 terminating in a conically formed portion 22 provided with an outer downturned flaring skirt 23.

An annular preferably soft rubber ring 24 having a generally U-shaped cross section as shown, is engaged over and around the upper beaded edge 11 of the receptacle side wall 10; and said rubber ring 24 discharges several functions to be presently described.

The cover means generally indicated at 25, which also functions as a motor, fan, air passage and filter support, preferably includes a ringlike member 26 terminating in a downturned portion 27 and an upturned portion 28.

A truncated foraminous conical filter support member 29 terminates in an outturned portion 30 forming an annular shoulder 31 with a conical portion 31a subjacent the shoulder 31; and the outturned portion 30 preferably terminates in an upturned annular portion 32, which may be secured by any suitable means, as by screws 33, with downturned portion 27 of member 26. A preferably rubber gasket 34 is interposed between members 32 and 26 to form an air-tight connection therebetween.

Figures 1, 5:
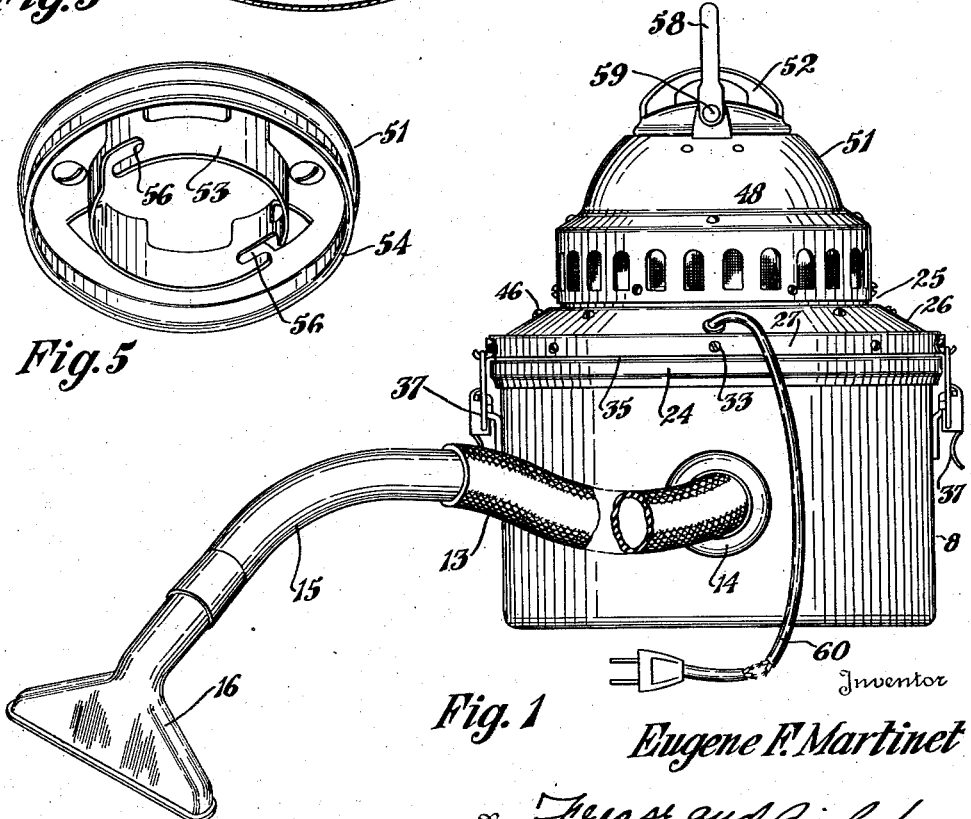
Figure 1 is a side elevation of a suction cleaner embodying the improved construction.
Fig. 5 is a perspective view of the cover lid illustrated in Fig. 2.

A generally conically shaped preferably paper filter member 35 (Fig. 6) has its lower pointed end 36 centrally located by support member 18, surrounds foraminous member 29, and has a conical portion 31b adjacent its upper edge interposed between and clamped in air-tight relation by support portion 31a downwardly outwardly against rubber ring 24 when the cover means 25 is clamped to receptacle 8 by well known releasable clamp means 37 (Fig. 1).

In the drawings, the openings in foraminous conical member 29 are only shown in section and diagrammatically in elevation, the preferred limit of the same being indicated in dot-dash lines. The member 29 need not be formed from sheet metal as shown, but may be formed of screening or from conically and circumferentially extending spaced wires or rods.

A motor, fan and outlet passage-forming unit generally indicated at 38, preferably includes a motor 39, fans 40 and numerous passage-forming walls not requiring detailed description herein. The unit 38 is mounted on the cover means 25 in such a manner as to avoid any noise due to vibration or centrifugal unbalance emanating from the motor and fan from being transmitted to any of the other metal parts of the cover means 25 or the panlike dust receptacle 8.

This improved mounting is accomplished primarily through the medium of the annular rubber mounting and supporting ring 41, which has in cross section, an inner annular bead edge 42, an outer annular bead edge 43, and an annular web 44 extending between the bead edges 42 and 43. The outer bead edge 43 of supporting ring 41 is securely mounted on and clamped to member 26 by clamping ring 45 and screws 46; and the inner bead edge 42 is engaged and clamped by clamping means 47 on motor fan and passage unit 38.

Thus, the entire weight of unit 38 is primarily supported only through the medium of ring 41 from cover means 25; the web portion 44 of ring 41 being essentially in shear in so supporting unit 38.

Cover means 25 is provided with windows 48 normally forming the exhaust outlet for the cleaner. However, it is sometimes desired to attach a hose and suitable blower tools to the exhaust side of a suction cleaner and for this purpose, cover means 25 is formed with an opening 49 for permitting a blower attachment to be detachably connected with exhaust neck 50 of unit 38.

Normally, opening 49 is closed by lid member 51 (Fig. 5) having a handle 52, an attaching sleeve 53 and a downturned edge 54 for engagement with rubber gasket 55 carried around opening 49 by cover means 25. Attaching sleeve 53 may be provided with the usual bayonet joint slots 56 for locking engagement with pins 57 on exhaust neck 50.

A carrying handle 58 may be pivotally mounted at 59 on cover means 25; and an electrical conductor 60 connected with any suitable source of power preferably extends through member 26 to motor 39. A preferably foot operated or push button control switch 61 for the motor 39 may also be mounted on member 26.

In using the improved suction cleaning apparatus shown in Figs. 1 to 6 inclusive, with the parts arranged as shown in Figs. 1 and 2, operation of switch 61 starts motor 39 and fans 40, which induce a flow of air through hose 13, thereby creating a suction in nozzle 16 so that when the same is drawn across a surface to be cleaned, dust and dirt is picked up in the usual manner.

The dust and dirt laden air enters receptacle 8 and swirls circumferentially therearound as indicated by the arrows in Fig. 3, so as to deposit most of the dust and dirt directly in the receptacle 8, and the remaining portion thereof is deposited momentarily on the outer under surface of paper filter member 35. The air passes through paper filter member 35 and foraminous cone 29, through the fan chamber of unit 38 and the passages formed in and by unit 38, and thence is discharged from the cleaner through windows 48. If a blast of air contains sharp matter such as sand or gritty dirt, there is a tendency to cut through a paper filter at the place where the blast hits the filter. This difficulty is avoided in the present improvements because the blast of dust and dirt laden air in being directed to swirl circumferentially of the receptacle 8 is prevented from striking the paper filter member 35 as a blast.

When it is desired to remove the filter, dust and dirt from the receptacle, it is only necessary to release clamps 37 and lift off cover means 25 by grasping handle 58. In so doing, filter member 35 has not been touched and remains in receptacle 8 covering the dirt therein. Receptacle 8 may then be taken to an incinerator, ash can, furnace, fireplace or the like and turned upside down to dump the filter and contents of the receptacle without touching the filter or the contents of the receptacle 8.

Figure 6:
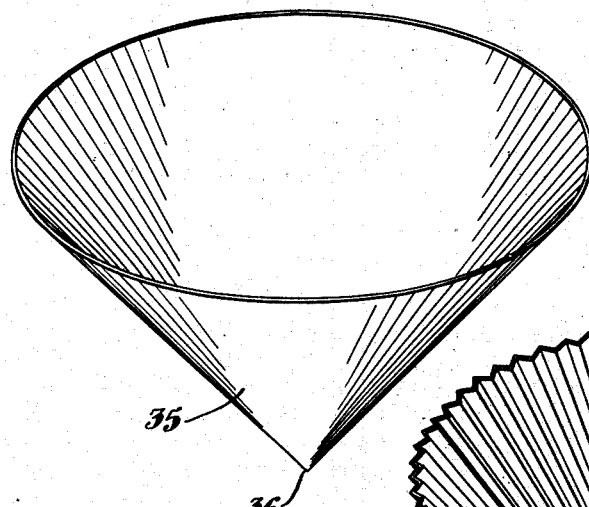
Fig. 6 is a perspective view on a smaller scale of the conical paper filter shown in Fig. 2.

Thereupon, a new disposable paper filter such as shown in Fig. 6, may be inserted into receptacle 8 with the bottom pointed end 36 thereof located by support member 18. The outer flared skirt 23 on support member 18 is arranged as shown, to prevent dirt, strings, thread or the like from catching and accumulating around or under member 18 in such a manner as to require the hands to be used to dislodge the same when dumping the contents of the receptacle.

The cover means 25 may then be replaced in receptacle 8 over the located paper cone 35. The locating member 18 and conical foraminous filter support 29 at this time cooperate to locate the conical filter member in proper dust filtering position as foraminous member 29 is being inserted within filter member 35. The rounded shoulder 31 likewise cooperates with rubber ring 24 to spread the upper annular edge of filter 35 slightly outwardly when clamps 37 are reengaged, at which time the conical portion 31a of member 29 clamps a conical portion 31b of filter member 35 downwardly outwardly against rubber ring 24 securely in air-tight relation.

When the parts are in the position shown in Fig. 2, the foraminous cone 29 prevents collapse of the paper filtering member 35 during cleaner operation; and the conical member 29 likewise provides a convenient space within its confines for the location of the motor 39 in a compact manner as shown.

No mechanical sounds or vibration emanating from the operation of the motor or fan are transmitted to the cover means 25 or receptacle 8 because the unit 38 is mounted solely on rubber ring 41. The possibility of such noise transmission and any amplification thereof is further eliminated by the soft rubber ring 24, which is interposed between the upper edge of receptacle 8 and the shoulder 31 on cover means 25.

A part of the weight of unit 38 is supported through lid 51 bearing on rubber gasket 55 carried by the upper end of cover means 25 when the lid 51 is arranged as shown in Fig. 2. The lid 51 in so supporting part of the weight of unit 38, reacts with an upward lifting tendency on unit 38 against rubber ring 41, which is yielding, so that the unit 38, while primarily supported solely by ring 41, is secondarily supported upon rubber gasket 55 when the parts are arranged as in Fig. 2. However, when lid 51 is removed and the suction cleaner is being operated as a blower, ring 41 not only acts primarily but solely as the supporting connection for unit 38 on cover means 25.

Figure 7:
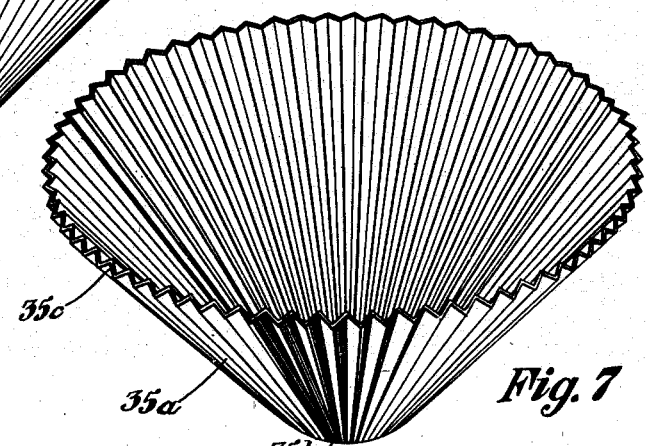
Fig. 7 is a view similar to Fig. 6 of a modified form of paper filter.
Figure 8:
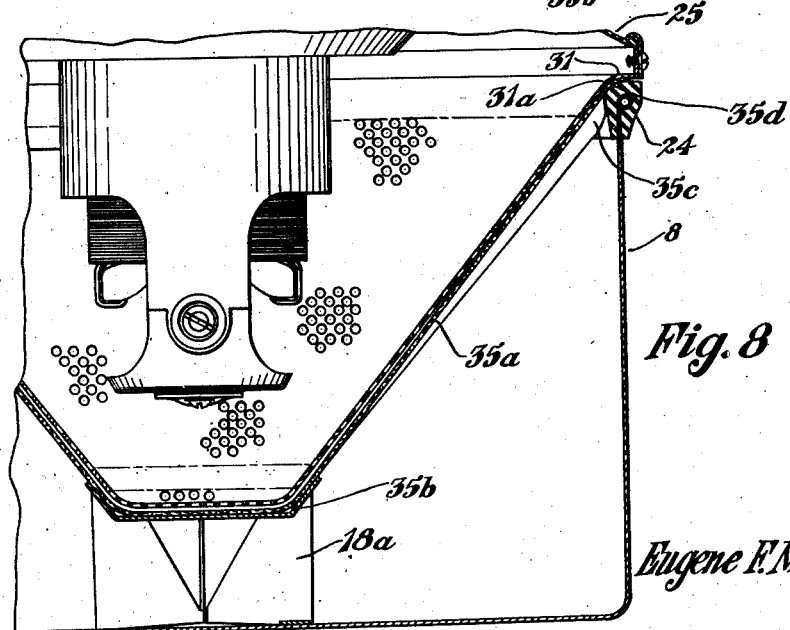
Fig. 8 is a fragmentary view similar to a portion of Fig. 2, illustrating a modified form of construction utilizing the filter shown in Fig. 7.

If it is desired to increase the filtering area of the paper filter, a corrugated or pleated paper filter indicated at 35a in Fig. 7, may be used and assembled as shown in Fig. 8, wherein a modified form of locating support member 18a is shown.

Filter 35a may have a generally truncated conical shape, as shown, with the pleats, folds or corrugations in the generally conical surface thereof tapering from nothing at 35b to a maximum depth at the upper edge 35c of filter 35a. This upper serrated or pleated edge 35c is readily squashed as indicated at 35d in Fig. 8 for clamping a subjacent conical portion of the same by portion 31a of cover means 25 downwardly outwardly against rubber ring 24 on receptacle 8.

The hopper and grinder construction immediately above the fan, shown but not described nor claimed herein, is claimed in my copending application filed of even date herewith, Serial No. 273,676; the fan construction shown but not claimed herein, is the subject matter of a patent application of Elmer J. Kasper, Serial No. 261,476, filed March 13, 1939; and the air flow arrangement shown but not claimed herein, is claimed in my co-pending application, Serial No. 288,167.

Accordingly, the present invention provides an improved motor mounting and filter construction for a suction cleaner of the vertical type in which a disposable preferably paper filter may be used; which does not require the attachment or detachment of any parts directly to or from the filter in installing or disposing of the same; which does not require the filter to be touched by the operator for disposing of the filter and collected dirt; in which all moving or rotating parts are mounted in such a way as to eliminate any noise due to vibration or centrifugal unbalance from being transmitted to other parts of the cleaner; and which improved construction is arranged in an inexpensive, convenient and readily operated manner.

The embodiments of the present improvements illustrated and described herein are by way of example and the scope of the present invention is not limited to the same or to the particular details thereof, but is commensurate with any and all improved subject matter contained herein, which may at any time properly under the United States patent laws, be set forth in claims hereof or originating herein, the elements of any of such claims being intended to include their reasonable mechanical equivalents obvious to those skilled in the art.

I claim:

1. In suction cleaner construction, walls forming an upwardly opening dust receptacle terminating in an upper annular edge, a soft rubber ring engaged over and around said receptacle edge, a truncated conical paper filter member within said receptacle having fluted conical walls terminating in an upper fluted edge lapping at least a portion of said ring, cover means for said receptacle including walls forming a foraminous conical member downwardly outwardly abutting said ring and supporting said filter against collapse, and detachable clamp means connecting the cover means to the receptacle, said shoulder and ring squashing said upper fluted filter edge and a portion of the filter member subjacent its upper edge being squashed and clamped by a conical portion of said filter supporting member downwardly outwardly against said ring in air-tight relation upon connecting the cover means to the receptacle by the clamp means.

2. In suction cleaner construction, bottom and side walls forming an upwardly opening dust receptacle, said side walls terminating in an upper annular edge, a soft rubber ring engaged over and around said receptacle edge, a centering support located centrally of said bottom wall, a conically-shaped paper filter member within said receptacle having a lower pointed end located in said support and having an upper edge lapping at least a portion of said ring, cover means for said receptacle including walls forming a foraminous conical member downwardly outwardly abutting said ring and supporting said filter against collapse, and detachable clamp means connecting the cover means to the receptacle and clamping a conical portion of said filter member subjacent its upper edge between said supporting member and ring in air-tight relation.

3. In suction cleaner construction, bottom and side walls forming an upwardly opening dust receptacle, said side walls terminating in an upper annular edge, a soft rubber ring engaged over and around said receptacle edge, an upwardly opening cup-shaped support terminating in an outwardly flared downturned skirt located centrally of said bottom wall, a conically-shaped paper filter member within said receptacle having a lower pointed end located in said support and having an upper edge lapping at least a portion of said ring, cover means for said receptacle including walls forming a foraminous conical member downwardly outwardly abutting said ring and supporting said filter against collapse, and detachable clamp means connecting the cover means to the receptacle and clamping a conical portion of said filter member subjacent its upper edge between said supporting member and ring in air-tight relation.

4. In suction cleaner construction, walls forming an upwardly opening dust receptacle terminating in an upper annular edge, a soft rubber ring engaged over and around said receptacle edge, a filter member within said receptacle having an upper edge lapping at least a portion of said ring, cover means for said receptacle, a motor and fan unit; means mounting said unit on said cover means including an annular rubber mounting and supporting ring, means connecting the inner edge of said ring to said unit, and means connecting the outer edge of said ring to said cover means; said cover means including walls forming a portion downwardly outwardly abutting said ring, detachable clamp means connecting the cover means to the receptacle and clamping a conical portion of said filter member subjacent its upper edge between said abutting portion and ring covered edge in air-tight relation, said cover means being provided with an opening, a lid for said opening including a portion abutting said cover means, and a detachable connection between said lid and unit whereby said lid partially supports said unit and reacts upwardly against said rubber mounting ring.

5. In suction cleaner construction, bottom and side walls forming an upwardly opening dust receptacle, said side walls terminating in an upper annular beaded edge, there being an inlet opening formed in one of said walls, a shield in said receptacle adjacent said opening for directing a blast of air passing through the opening circumferentially around said receptacle, centering support means located centrally at the bottom of said receptacle, a soft rubber ring generally U-shaped in cross section engaged over and around said beaded edge, a conically-shaped paper filter member within said receptacle having a lower pointed end located in said support and having an upper edge lapping at least a portion of said ring, cover means for said receptacle, a motor and fan unit; means mounting said unit on said cover including an annular rubber mounting and supporting ring, means connecting the inner edge of said ring to said unit and means connecting the outer edge of said ring to said cover means; said cover means also including walls forming a foraminous conical member downwardly outwardly abutting said ring and supporting said filter against collapse, detachable clamp means connecting the cover means to the receptacle, said downwardly outwardly abutting portion of said conical member engaging and clamping a conical portion of said filter member subjacent its upper edge against the ring in air-tight relation upon connecting the cover means to the receptacle with the clamp means.

EUGENE F. MARTINET.